(12) United States Patent
Li et al.

(10) Patent No.: US 8,749,532 B2
(45) Date of Patent: Jun. 10, 2014

(54) PEN-LIKE OPTICAL INPUT DEVICE

(75) Inventors: Sheau Lin Li, New Taipei (TW); Tsu Nan Lee, New Taipei (TW); Chien Mo Lai, New Taipei (TW)

(73) Assignee: KYE Systems Corp., New Taipei (TW)

( * ) Notice: Subject to any disclaimer, the term of this patent is extended or adjusted under 35 U.S.C. 154(b) by 557 days.

(21) Appl. No.: 13/064,518

(22) Filed: Mar. 30, 2011

(65) Prior Publication Data

US 2011/0242063 A1    Oct. 6, 2011

(30) Foreign Application Priority Data

Mar. 31, 2010    (TW) ................................ 99109980 A

(51) Int. Cl.
*G06F 3/033*    (2013.01)

(52) U.S. Cl.
USPC ......... 345/179; 345/166; 345/173; 178/18.01

(58) Field of Classification Search
USPC .................................. 345/173–180, 165–166; 178/18.01–18.04
See application file for complete search history.

(56) References Cited

U.S. PATENT DOCUMENTS 5,414,227 A * 5/1995 Schubert et al. ............... 345/179
6,151,015 A * 11/2000 Badyal et al. .................. 345/179

* cited by examiner

*Primary Examiner* — Kimnhung Nguyen
(74) *Attorney, Agent, or Firm* — Bacon & Thomas, PLLC

(57) ABSTRACT

A pen-like optical input device includes a body. A light source, a light sensing unit and a lens are disposed in the body, a light ray is emitted by the light source to the outside of the body, and a reflected light ray is generated outside the body. The reflected light ray then is received by the light sensing unit after being refracted by the lens, in which the light sensing unit has a light receiving surface, and a normal of the light receiving surface inclines to an optical axis of the lens, thereby forming an angle with the optical axis.

12 Claims, 10 Drawing Sheets

PEN-LIKE OPTICAL INPUT DEVICE

CROSS-REFERENCE TO RELATED APPLICATIONS

This non-provisional application claims priority under 35 U.S.C. §119(a) on Patent Application No(s). 099109980 filed in Taiwan, R.O.C. on Mar. 31, 2010, the entire contents of which are hereby incorporated by reference.

BACKGROUND OF THE INVENTION

1. Field of Invention

The present invention relates to an optical input device, and more particularly to a pen-like optical input device.

2. Related Art

With the rapid development of science and technology, computer operating systems are widely used in daily life. Generally speaking, when operating a computer operating system, a user must control the movement of a cursor through peripheral input devices such as a mouse, a touchpad or a trackball, so as to input operating instructions on a window interface of the computer. Taking an optical mouse as an example, in addition to functions of the common optical mouse such as moving the cursor and clicking/selecting page data, currently in the structure design of the optical mouse, the input devices such as an optical pen or a pen-like optical mouse have been developed so that the user can use the optical mouse to write or underline and comment the page data.

For example, U.S. Pat. No. 6,151,015 has disclosed a pen like computer pointing device, in which a light emitting diode (LED) or a laser LED, an optical sensor and a lens are disposed in a pen like case. A light ray generated by the LED is projected to a work surface, for example, a desk. After a reflected light ray of the light ray is generated on the work surface, the reflected light ray is refracted to the optical sensor through the lens, such that the optical sensor detects a change of the light ray and forms an image, thereby generating a corresponding cursor movement signal and inputting the signal to the computer. When the pen-like optical mouse moves, a movement track thereof is recorded as a group of continuous images shot at a high speed. Finally, the shot images are analyzed and processed by an interface microprocessor inside the optical mouse, and changes of positions of feature points on these images are analyzed, so as to determine a moving direction and moving distance of the mouse and complete the location of the cursor.

However, currently in this type of optical mouse, the lens and the optical sensor are disposed in the case in parallel, that is, a direction of an optical axis of the lens is parallel to that of the normal of the optical sensor. Therefore, when the user operates the pen-like optical mouse in a general pose like holding a pen (for example, the penholder inclines to the work surface), since the optical axis of the lens inclines to the work surface, an object distance of the lens relative to the work surface is changed (extended or shortened).

However, in the case that a focal length of the lens and a sensing range of the optical sensor are fixed, when the object distance between the lens and the work surface changes, an imaging range formed after the reflected light ray is refracted by the lens fails to fall into the focus. For instance, the imaging range of the reflected light ray exceeds the sensing range of the optical sensor, which results in the generation of a blur image since the reflected light ray cannot be completely imaged on the optical sensor, causing confusion when the optical sensor reads an optical signal and degrading the quality (for example contrast) of the image detected by the optical sensor, and even resulting in errors in locating the cursor.

SUMMARY OF THE INVENTION

Accordingly, the present invention is a pen-like optical input device, which solves the problem in the use of the conventional pen-like optical mouse that when an optical axis of a lens inclines to a work surface, an imaging quality is degraded since an object distance from the lens to the work surface is changed, making an imaging range generated after a reflected light ray is refracted by the lens exceed a sensing range of an optical sensor.

The present invention provides a pen-like optical input device, which comprises a body, a light source, a light sensing unit and a lens. The light source, the light sensing unit and the lens are disposed in the body, and the light sensing unit comprises a light receiving surface on a side facing the lens. The light source emits a light ray to the outside of the body, and a reflected light ray is generated outside the body. The light sensing unit receives the reflected light ray, and the lens refracts the reflected light ray to the light sensing unit. A normal of the light receiving surface inclines to an optical axis of the lens, and a first angle exists between the normal of the light receiving surface and the optical axis of the lens, in which a degree of the first angle is in direct proportion to a magnification of the lens.

The present invention further provides a pen-like optical input device, which comprises a body and an optical-mechanical module. The optical-mechanical module is disposed in the body, and is capable of swinging relative to the body and/or moving along an axis of the body. The optical-mechanical module comprises a light source, a light sensing unit and a lens, and the light sensing unit comprises a light receiving surface on a side facing the lens. A normal of the light receiving surface inclines to an optical axis of the lens, and a first angle exists between the normal of the light receiving surface and the optical axis of the lens, in which a degree of the first angle is in direct proportion to a magnification of the lens.

According to the pen-like optical input device of the present invention, the light source, the lens and the light sensing unit are disposed in the body, and the normal of the light receiving surface of the light sensing unit inclines to the optical axis of the lens, such that a sensing range of the light sensing unit in the body is increased. Therefore, when the optical axis of the lens inclines to the work surface so that an object distance from the lens to the work surface is changed, an inclined angle between the optical axis and the normal of the work surface is compensated by the angle between the normal of the light receiving surface and the optical axis, such that the reflected light ray after being refracted by the lens entirely falls into the sensing range of the optical sensing unit, thereby maintaining a good image quality.

DETAILED DESCRIPTION OF THE INVENTION

Figure 1:
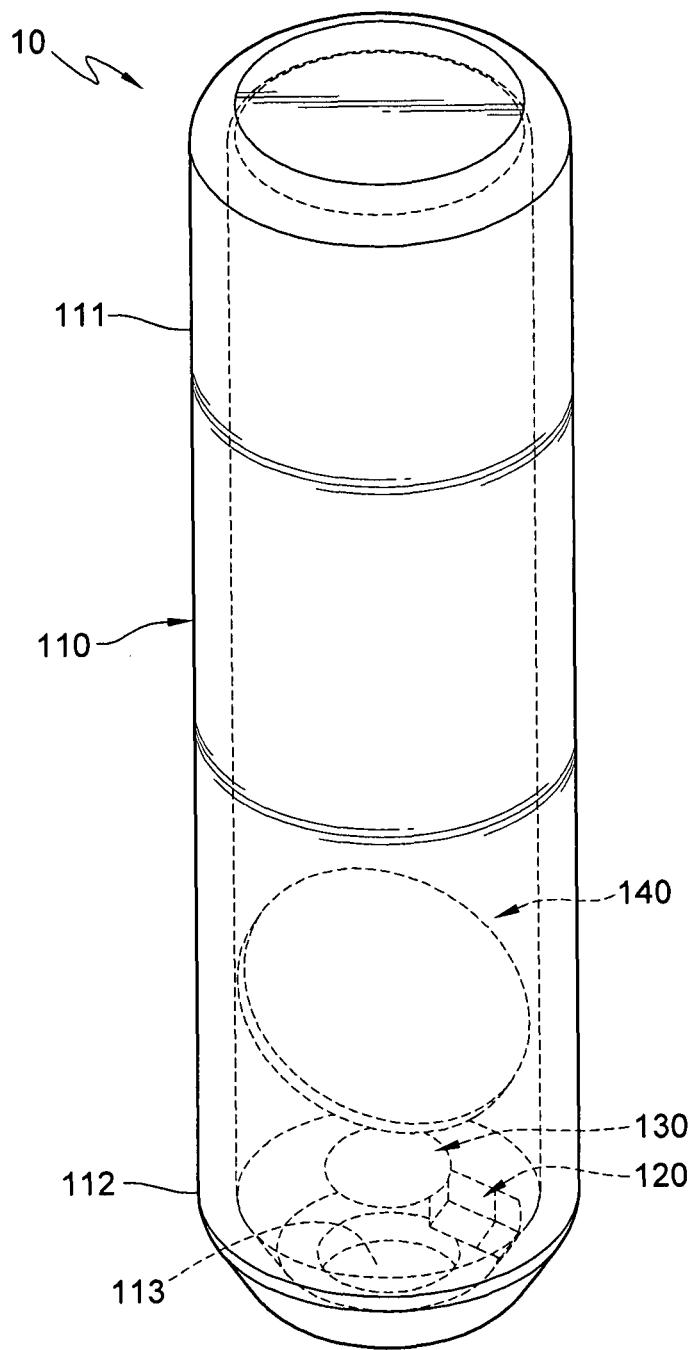
FIG. 1 is a schematic three-dimensional view according to a first embodiment of the present invention.
Figure 2:
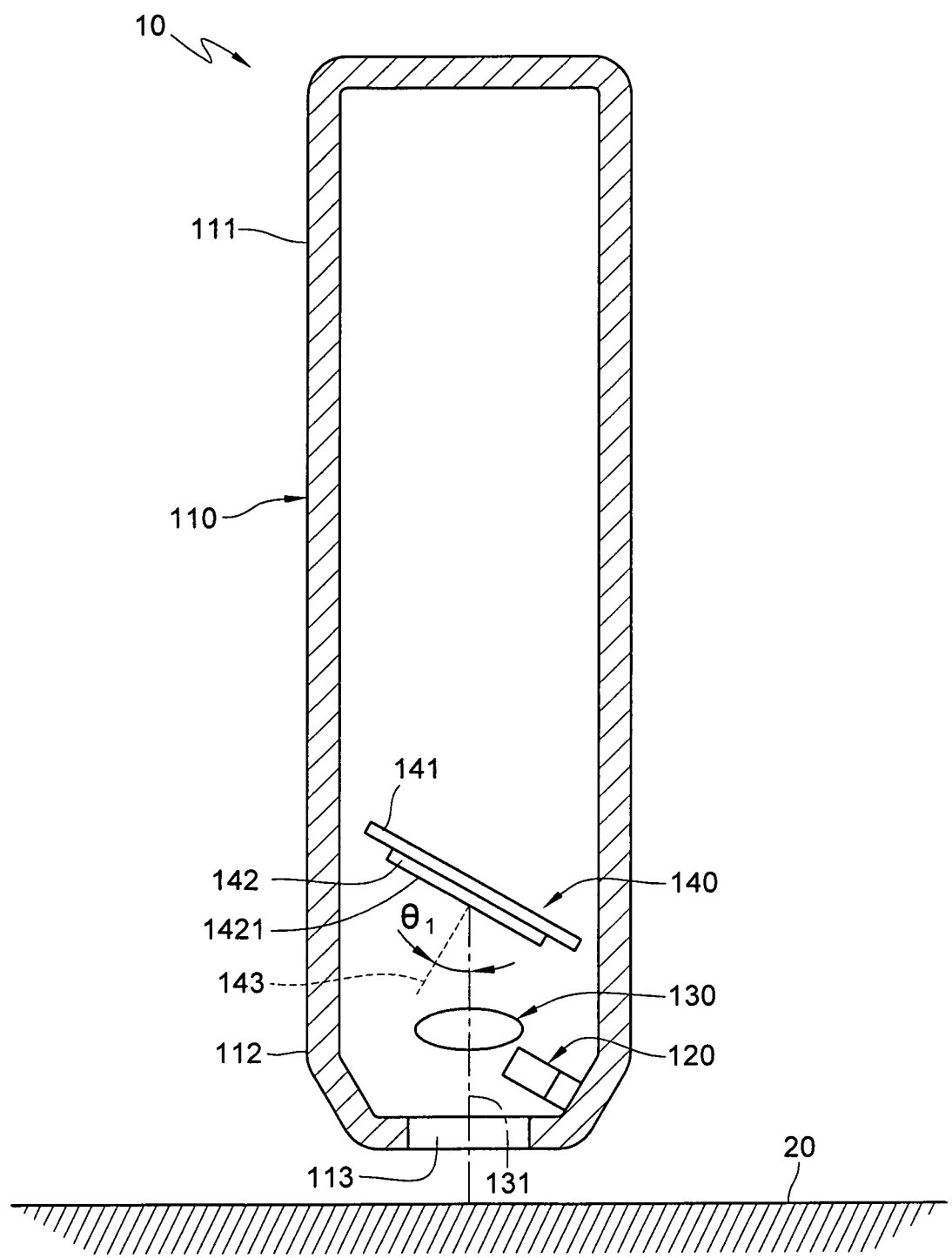
FIG. 2 is a schematic cross-sectional view according to the first embodiment of the present invention.

As shown in FIGS. 1 and 2, a pen-like optical input device 10 according to a first embodiment of the present invention comprises a body 110, a light source 120, a lens 130 and a light sensing unit 140. The body 110 is a hollow round pole, and forms a penholder-like shape. The body 110 comprises a first end 111 and a second end 112 opposite to each other, and comprises a light-transmissive hole 113 on an end surface of the second end 112. The light source 120, the lens 130 and the light sensing unit 140 are disposed at positions near the second end 112 in the body 110. The light source 120 may be but is not limited to a light emitting diode (LED), and may also be a light emitting component capable of emitting directional light, for example, a laser diode. The lens 130 and the light sensing unit 140 are corresponding to the light-transmissive hole 113 of the body 110, and the lens 130 is located between the light sensing unit 140 and the light-transmissive hole 113. The lens 130 may be of various types, such as a biconvex lens, a biconcave lens or a concave-convex lens. The lens 130 comprises an optical axis 131, and a direction of the optical axis 131 is parallel to an axis direction of the body 110. In this embodiment, the optical axis 131 located on an axis position of the body 110 is taken as an example, but the present invention is not limited to this.

The light sensing unit 140 comprises a circuit board 141 and an optical sensor 142. The optical sensor 142 is electrically disposed on the circuit board 141, and the optical sensor 142 may be but is not limited to a Charged Coupled Device (CCD) or a Complementary Metal-Oxide semiconductor (CMOS). The optical sensor 142 comprises a light receiving surface 1421 on a side facing the lens, and a normal 143 of the light receiving surface 1421 (an imaginary line perpendicular to the light receiving surface 1421) inclines to the optical axis 131 of the lens 130 (a connection of spherical centers of front and back surfaces of the lens 130), thereby forming an angle $\theta_1$ with the optical axis 131. A degree of the angle $\theta_1$ is in direct proportion to a magnification of the lens 130. Therefore, the light sensing unit 140 is correspondingly disposed in the pen-like optical input device 10 according to the type of the lens 130. For example, when the magnification of the lens 130 is one, the angle $\theta_1$ is 30°; when the magnification of the lens 130 is smaller than one, the angle $\theta_1$ is between 10° and 30°; when the magnification of the lens 130 is greater than one, the angle $\theta_1$ is between 30° and 50°.

Figure 3:
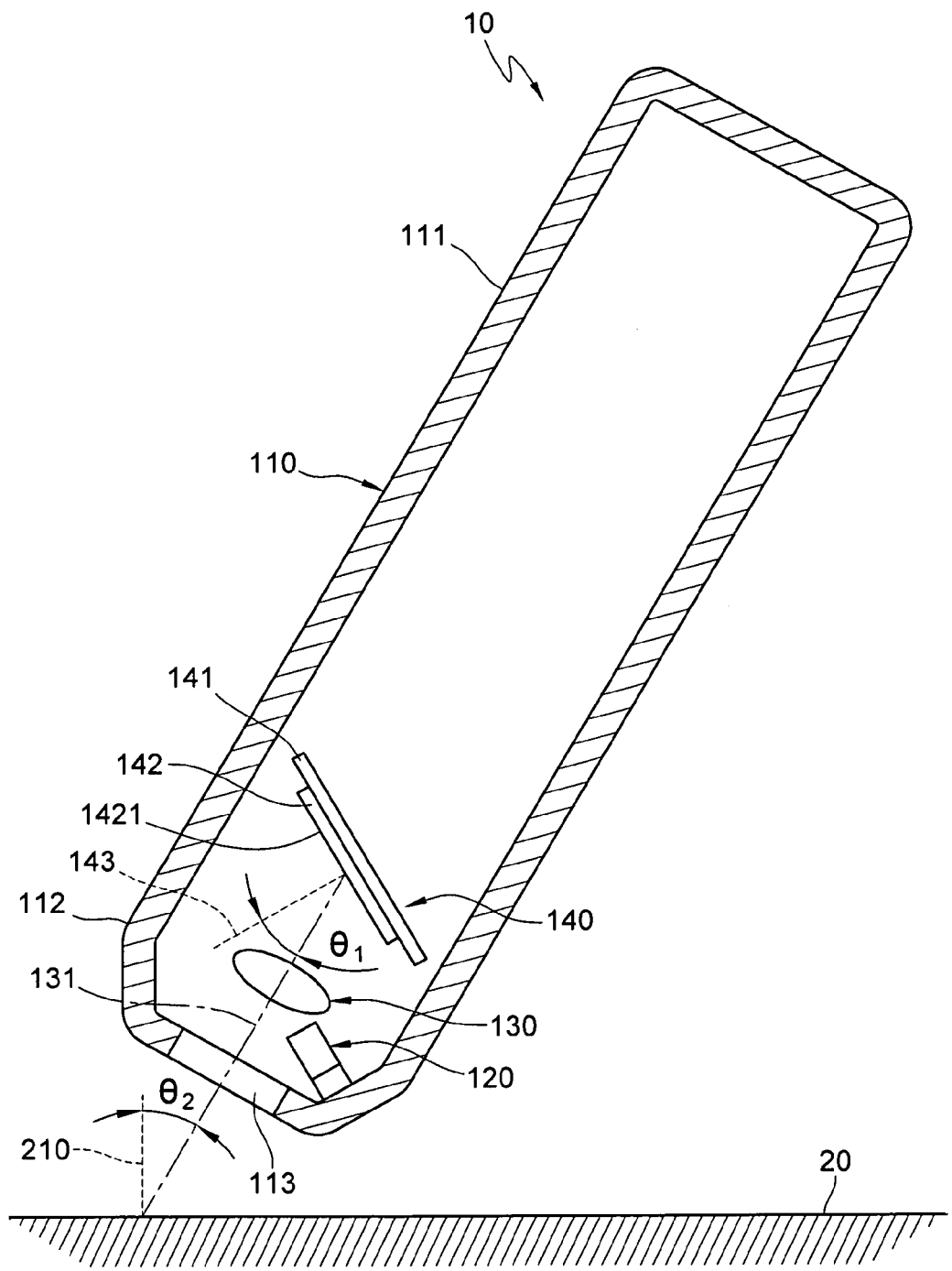
FIG. 3 is a schematic view of a use state according the first embodiment of the present invention.

Referring to FIGS. 2 and 3, in use of the pen-like optical input device 10, when the user operates the pen-like optical input device 10 perpendicular to a work surface 20 (for example, a desk or a mouse pad), the optical axis 131 of the lens 130 is parallel to a normal 210 of the work surface 20 (an imaginary line perpendicular to the work surface 20). At this time, the light source 120 emits a light ray to the outside of the body 110. The light ray penetrates the body 110 and travels to the work surface 20 through the light-transmissive hole 113, and forms a reflected light ray on the work surface 20. Then, the reflected light ray enters the body 110 through the light-transmissive hole 113, and travels to the light sensing unit 140 after being refracted by the lens 130, and is then received by the optical sensor 142. Since the reflected light ray after refraction entirely falls into a sensing range of the optical sensor 142, a complete image can be obtained through complete imaging on the optical sensor 142.

In addition, when the user inclines the pen-like optical input device 10 to the work surface 20 in operation, that is, operates the pen-like optical input device 10 in a general pose for holding a pen, the axis direction of the pen-like optical input device 10 inclines to the normal 210 of the work surface 20, making the optical axis 131 of the lens 130 also incline to the normal 210 of the work surface 20 and form another angle $\theta_2$ with the normal 210 of the work surface 20, in which the angle is for example between 10° to 50°. Furthermore, the angle $\theta_1$ between the normal 143 of the light sensing surface 1421 of the optical sensor 142 and the optical axis 131 and the angle $\theta_2$ between the normal 210 of the work surface 20 and the optical axis 131 are located at the same side of the optical axis 131.

At this time, different from in the perpendicular operation, the optical axis 131 inclines to the normal 210 of the work surface 20, which causes an object distance between the lens 130 and the work surface 20 to change, thereby expanding the imaging range of the reflected light ray refracted to the optical sensor 142. However, since the normal 143 of the light sensing surface 1421 of the optical sensor 142 also inclines to the optical axis 131, the sensing range of the optical sensor 142 relative to the lens 130 also increases. Therefore, the angle $\theta_1$ between the normal 143 of the light sensing surface 1421 and the optical axis 131 compensates the angle $\theta_2$ between the optical axis 131 and the normal 210 of the work surface 20, such that the reflected light ray can be entirely imaged on the optical sensor 142 after being refracted by the lens 130. Therefore, the problem of the poor imaging quality caused by the fact that the imaging range of the reflected light ray after being refracted exceeds the sensing range of the optical sensor 142 can be avoided.

Figure 4:
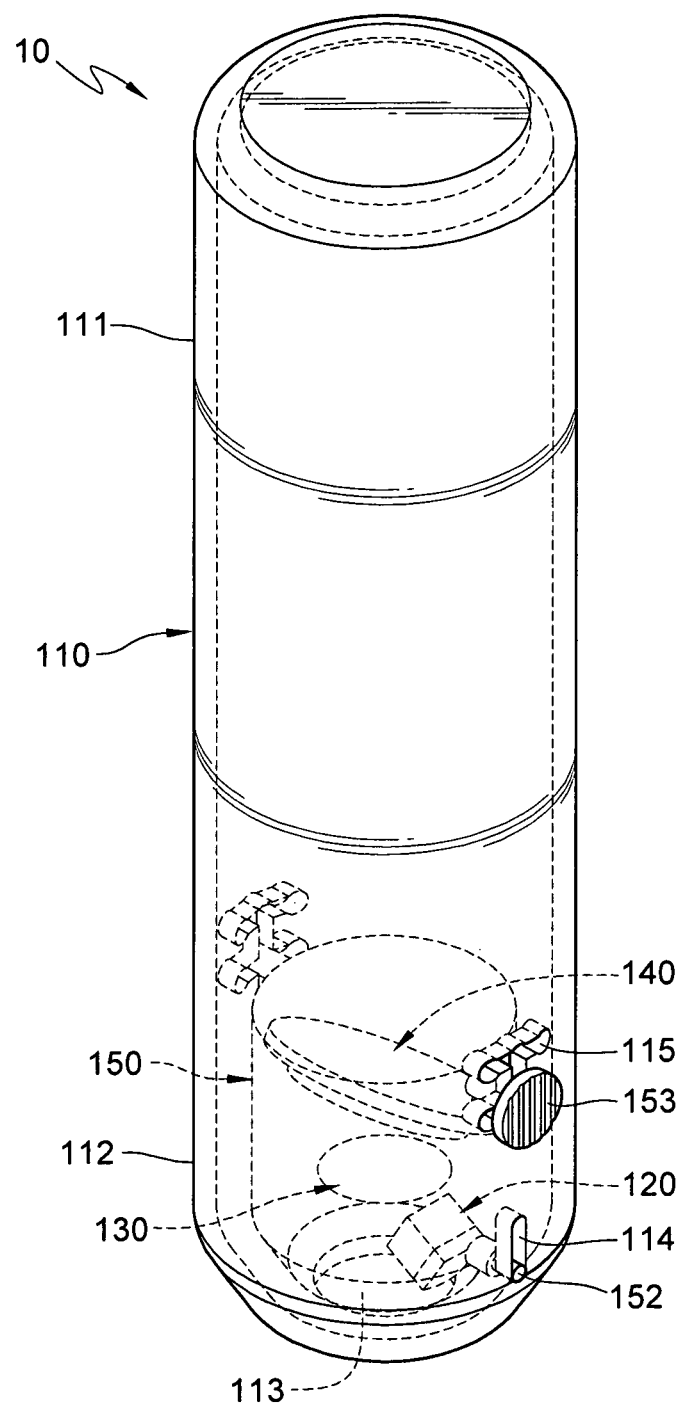
FIG. 4 is a schematic three-dimensional view of a second embodiment of the present invention.
Figure 5:
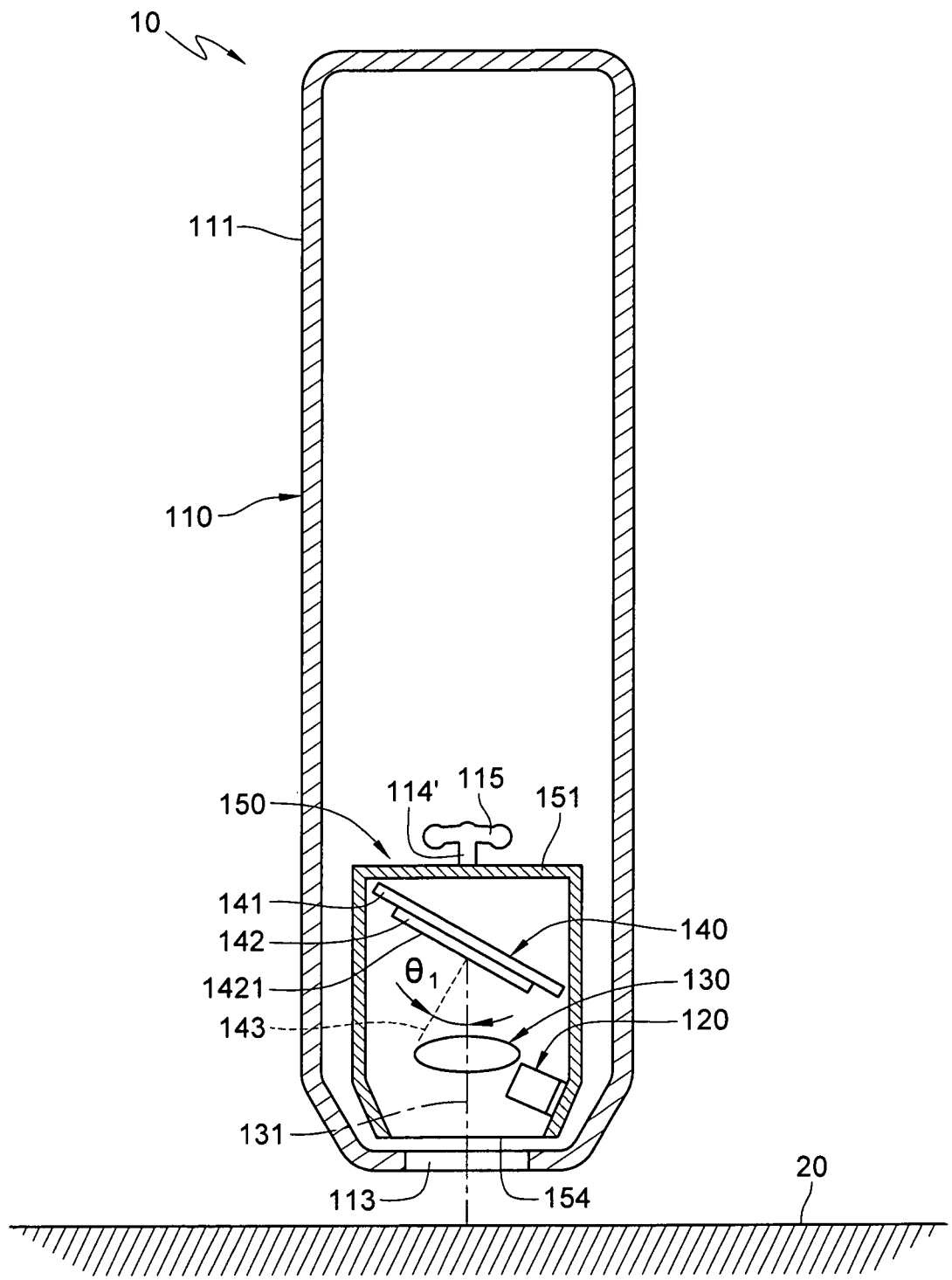
FIG. 5 is a schematic cross-sectional view according to the second embodiment of the present invention.

In addition, in the pen-like optical input device 10 according to the present invention, besides the disposition manner of fixing the light source 120, the lens 130 and the light sensing unit 140 inside the body 110, the movable disposition manner relative to the body 110 can also be employed as shown in FIGS. 4 and 5.

Referring to FIGS. 4 and 5, a pen-like optical input device 10 according to a second embodiment of the present invention comprises a body 110 and an optical-mechanical module 150. The body 110 is a hollow round pole with a penholder-like shape. The body 110 comprises a first end 111 and a second end 112 opposite to each other, in which an end surface of the second end 112 comprises a light-transmissive hole 113, and two longitudinal grooves 114 and 114' and two horizontal grooves 115 connected to the inside of the body 110 are respectively disposed on two opposite sides where the second end 112 is jointed with the end surface. The two longitudinal grooves 114 and 114' are disposed on the body 110 sequentially from the second end 112 to the first end 111 along an axis direction of the body 110. The horizontal grooves 115 are disposed on the body 110 along a direction perpendicular to the two longitudinal grooves 114 and 114'. The two horizontal grooves 115 are disposed on the two opposite ends of the longitudinal groove 114' near the first end 111 on the body 110, and are connected with the longitudinal groove 114'.

Figure 6:
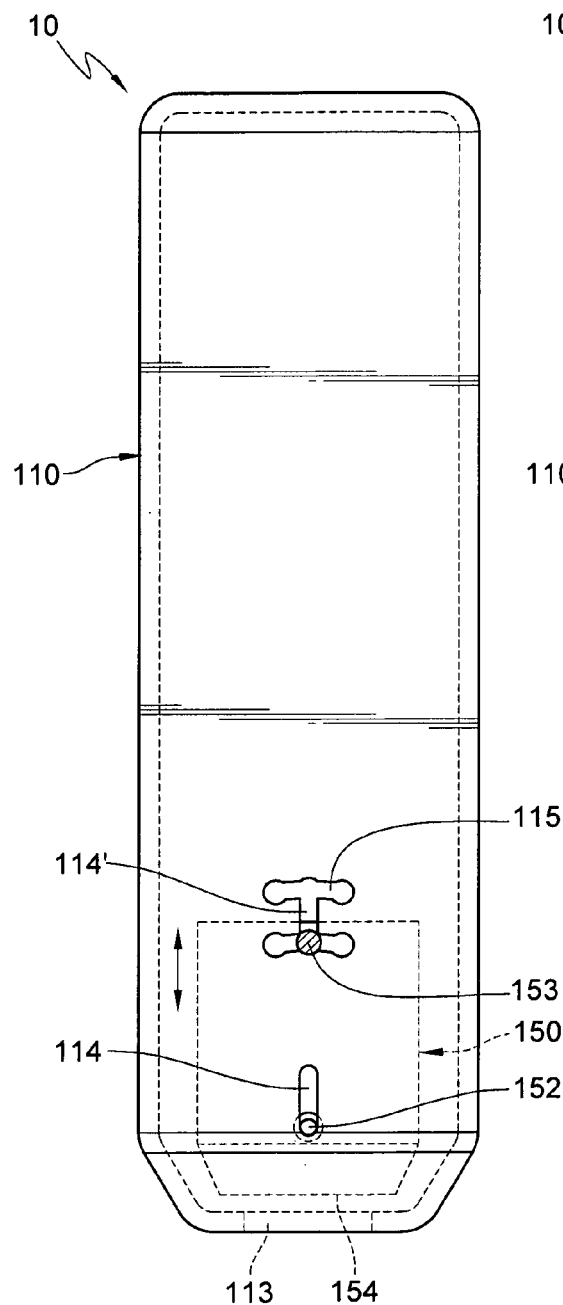
FIG. 6 is a schematic view of the actuation of an optical-mechanical module moving along an axis direction of a body according to the second embodiment of the present invention.
Figure 7:
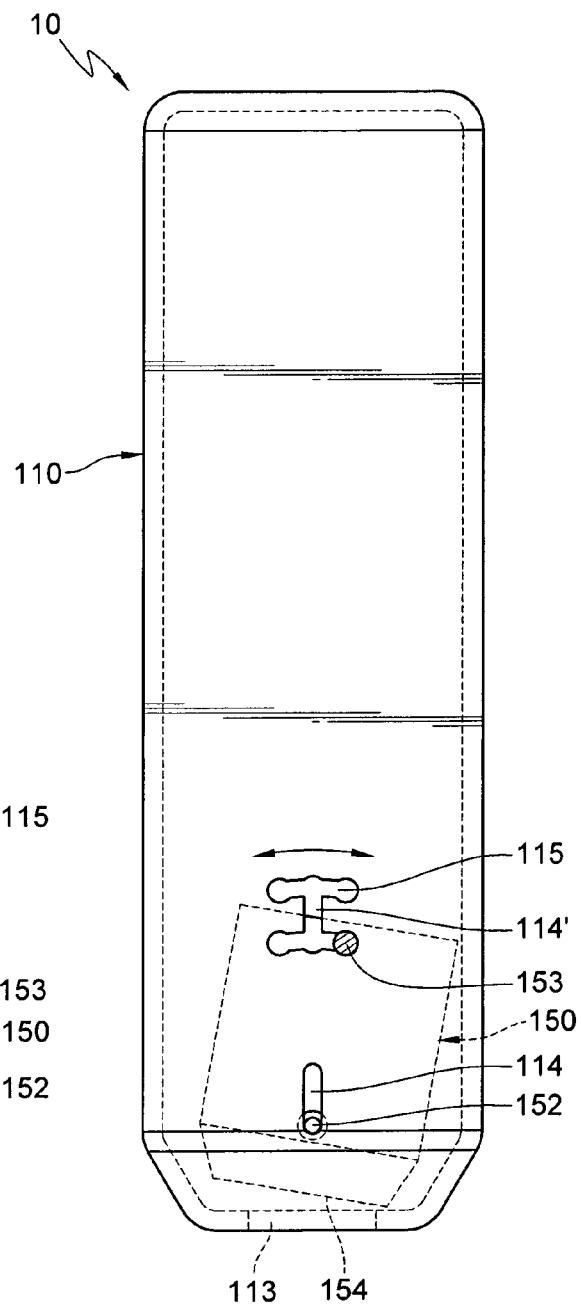
FIG. 7 is a schematic view of the actuation of an optical-mechanical module swinging relative to a body according to the second embodiment of the present invention.

The optical-mechanical module 150 comprises a case 151, a light source 120, a lens 130 and a light sensing unit 140. The case 151 comprises a shaft 152 and an adjustment lever 153 in pair. The pair of the shaft 152 and the adjustment lever 153 respectively passes through the two longitudinal grooves 114 and 114' disposed on the same side of the body 110. Referring to FIGS. 6 and 7, the shaft 152 and the adjustment lever 153 can simultaneously slide in the longitudinal grooves 114 and 114', and drive the case 151 to slide between the first end 111 and the second end 112 along an axis direction of the body 110. Furthermore, the adjustment lever 153 can selectively move in the horizontal groove 115, so as to drive the case 151 to swing relative to the body 110 along a radial direction of the body 110. The case 151 may move and swing relative to the body 110 in other manners, which is not limited to the embodiment of the present invention.

Referring to FIGS. 4 and 5 again, the case 151 further comprises an opening 154. The opening 154 corresponds to the light-transmissive hole 113 of the body 110. The light source 120 is disposed at a position in the case 151 near the opening 154. The light source 120 may be but is not limited to an LED or a light emitting component capable of emitting directional light such as a laser diode. The lens 130 and the light sensing unit 140 are disposed at positions in the case 151 corresponding to the opening 154, and the lens 130 is located between the opening 154 and the light sensing unit 140. The lens 130 may be of various types, such as a biconvex lens, a biconcave lens or a concave-convex lens. The lens 130 comprises an optical axis 131, and the optical axis 131 is located on an axis position of the case 151.

The light sensing unit 140 comprises a circuit board 141 and an optical sensor 142 electrically disposed on the circuit board 141. The optical sensor 142 may be a CCD or a CMOS, but is not limited to this. The optical sensor 142 comprises a light receiving surface 1421. The light receiving surface 1421 is disposed on a side of the optical sensor 142 facing the lens 130, and a normal 143 of the light receiving surface 1421 inclines to the optical axis 131 of the lens 130, thereby forming an angle $\theta_1$ with the optical axis 131. A degree of the angle $\theta_1$ is in direct proportion to a magnification of the lens 130. Therefore, the light sensing unit 140 is correspondingly disposed in the pen-like optical input device 10 according to the type of the lens 130. In this embodiment, for example, the magnification of the lens 130 is one, and the degree of the angle $\theta_1$ is 30°; however, the present invention is not limited to this.

Figure 8:
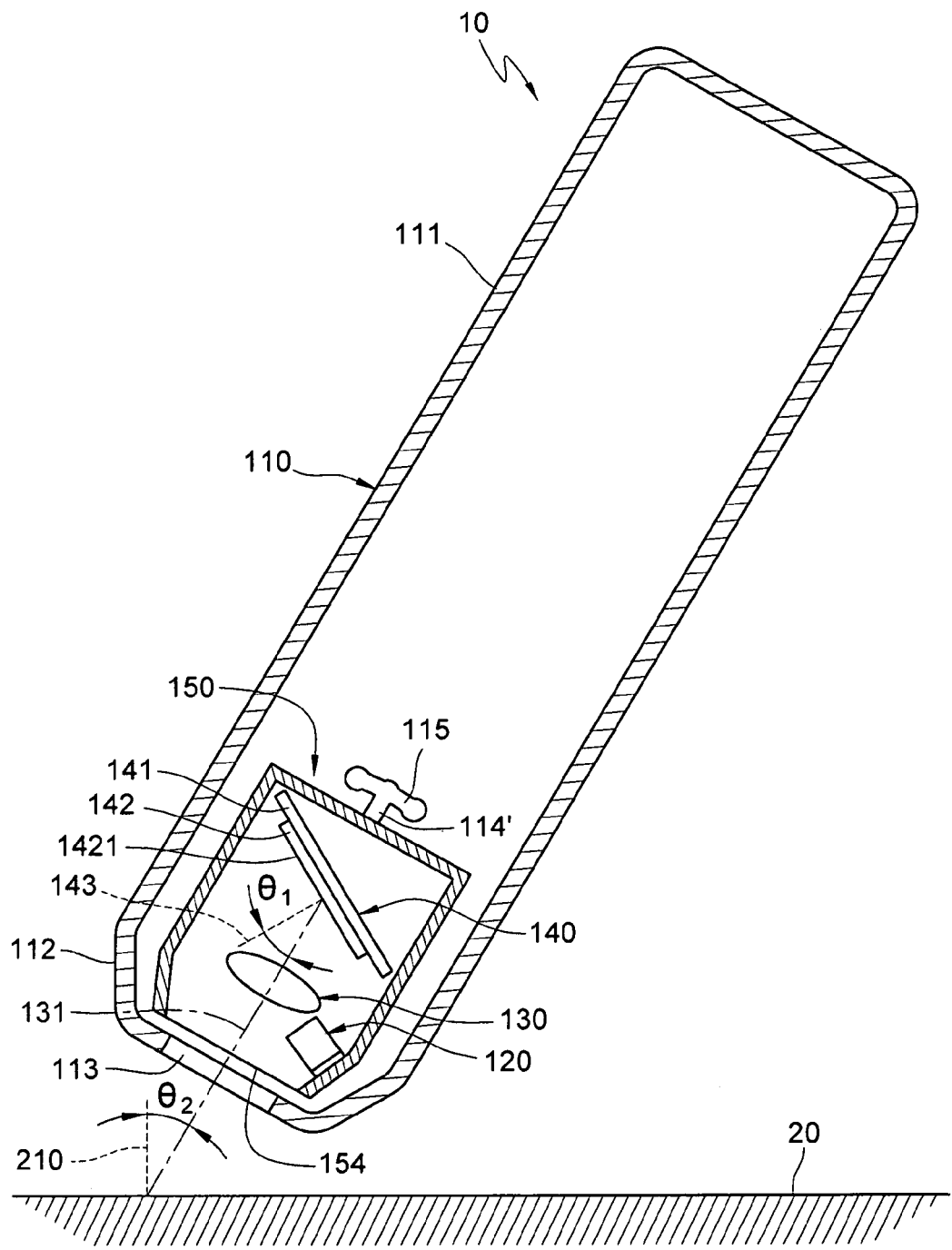
FIG. 8 is a schematic view of a use state according the second embodiment of the present invention.

Referring to FIGS. 4 and 8, when the user inclines the pen-like optical input device 10 to a work surface 20 in operation, that is, operates the pen-like optical input device 10 with a general pose for holding a pen, the optical axis 131 of the lens inclines to a normal 210 of the work surface 20, thereby forming another angle $\theta_2$, for example, the angle $\theta_2$ of 30°. Furthermore, the angle $\theta_1$ between the normal 143 of the light receiving surface 1421 of the optical sensor 142 and the optical axis 131 and the angle $\theta_2$ between the normal 210 of the work surface 20 and the optical axis 131 are located at the same side of the optical axis 131. At this time, the angle $\theta_2$ between the normal 210 of the work surface 20 and the optical axis 131 can be compensated by the angle $\theta_1$ between the normal 143 of the light receiving surface 1421 and the optical axis 131, such that the reflected light ray can be entirely imaged on the optical sensor 142 after being refracted by the lens 130, so as to maintain a stable imaging quality.

Furthermore, when operating the pen-like optical input device 10, the user may control the shaft 152 and the adjustment lever 153 to slide in the longitudinal grooves 114 and 114' of the body 110 (as shown in FIG. 5), or control the adjustment lever 153 to move in the horizontal groove 115 of the body 110 (as shown in FIG. 6) according to the distance between the lens 130 and the work surface 20, or the change of the angle between the optical axis 131 of the lens 130 and the work surface 20, so as to fine adjust the distance between the lens 130 and the work surface 20 and the angle between the optical axis 131 and the work surface 20 through characteristics that the optical-mechanical module 150 can move and swing relative to the body 110, so that the imaging range of the reflected light ray after being refracted is kept in the sensing range of the optical sensor 142. Thus, a stable imaging quality is maintained.

Figure 9:
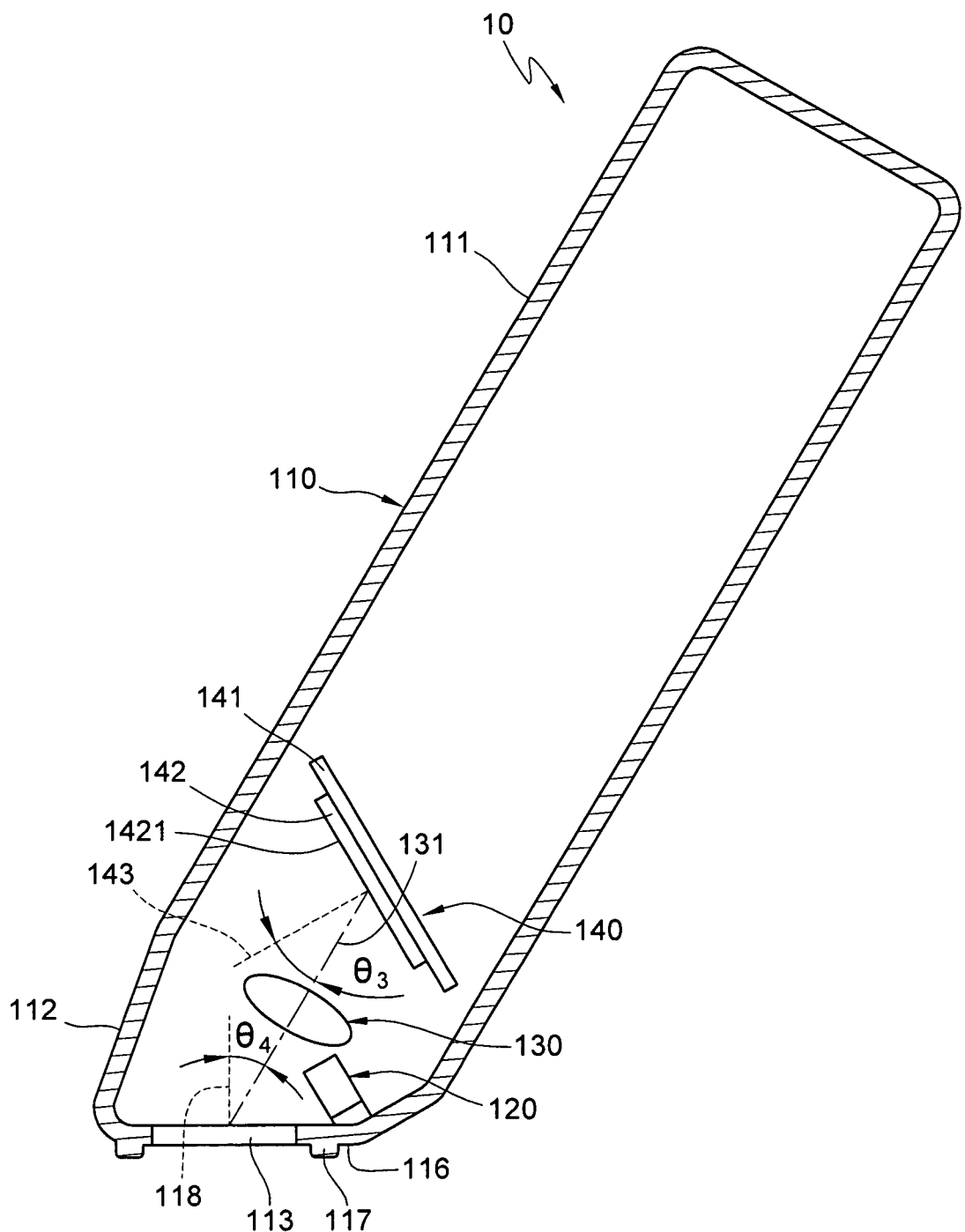
FIG. 9 is a schematic cross-sectional view according to a third embodiment of the present invention.
Figure 10:
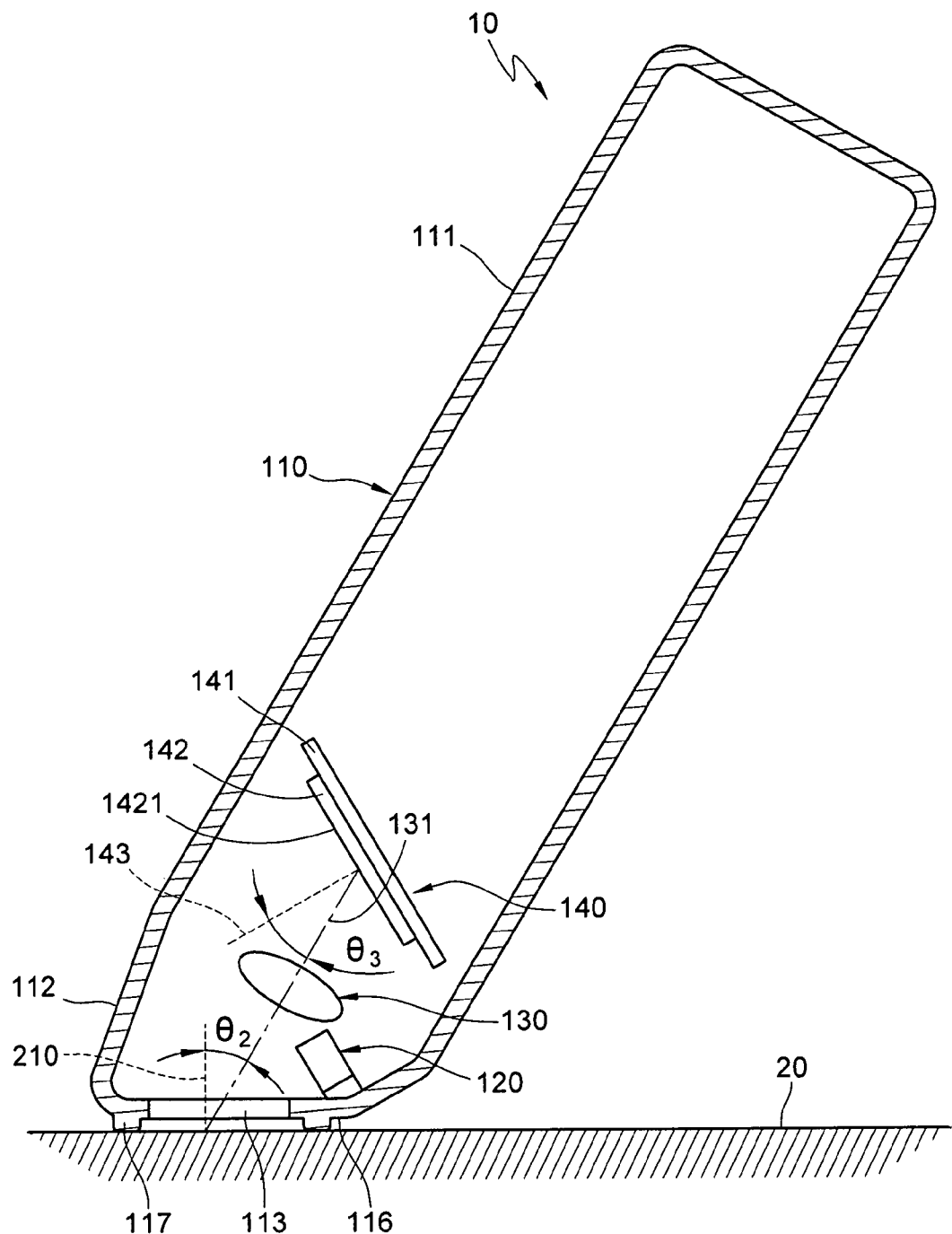
FIG. 10 is a schematic view of a use state according the third embodiment of the present invention.

FIG. 9 is a schematic cross-sectional view according to a third embodiment of the present invention. A pen-like optical input device 10 according to the third embodiment of the present invention comprises a body 110, a light source 120, a lens 130 and a light sensing unit 140. The body 110 is a hollow round pole. The body 110 comprises a first end 111 and a second end 112 opposite to each other. The second end 112 comprises a contact surface 116 and a light-transmissive hole 113. The light-transmissive hole 113 is disposed in the contact surface 116 and runs through the contact surface 116, and the contact surface 116 comprises an urging portion 117 on another side opposite to the first end 111 for urging the work surface 20 when the pen-like optical input device 10 is in operation (as shown in FIG. 10). An axis of the first end 111 inclines to the contact surface 116 of the second end 112.

The light source 120 is disposed at a position near the light-transmissive hole 113 in the body 110. The light source 120 may be an LED or a light emitting component capable of emitting directional light such as a laser diode. The lens 130 and the light sensing unit 140 are disposed at positions near the second end 112 in the body 110, and the lens 130 is located between the light sensing unit 140 and the light-transmissive hole 113. The lens 130 may be of various types, such as a biconvex lens, a biconcave lens or a concave-convex lens. The lens 130 comprises an optical axis 131, and a direction of the optical axis 131 is parallel to an axis direction of the first end 111. In this embodiment, the optical axis 131 is located on an axis position of the first end 111, such that a normal 118 of the contact surface 116 (an imaginary line perpendicular to the contact surface 116) inclines to the optical axis 131, thereby forming a second angle $\theta_4$ with the optical axis 131, in which the second angle $\theta_4$ is between 10° to 50°.

The light sensing unit 140 comprises a circuit board 141 and an optical sensor 142. The optical sensor 142 is electrically disposed on the circuit board 141, and the optical sensor 142 may be but is not limited to a CCD or a CMOS. The optical sensor 142 comprises a light receiving surface 1421 on a side facing the lens 130, and a normal 143 of the light receiving surface 1421 inclines to the optical axis 131 of the lens 130, thereby forming a first angle $\theta_3$ with the optical axis 131. A degree of the first angle $\theta_3$ may be set between 10° to 50°, and the degree of the first angle $\theta_3$ is in direct proportion to a magnification of the lens 130.

A corresponding relation between the degrees of the firs angle $\theta_3$ and the second angle $\theta_4$ and the magnification of the lens 130 is as follows: when the magnification of the lens 130 is one, the first angle $\theta_3$ is equal to the second angle $\theta_4$; when the magnification of the lens 130 is smaller than one, the first angle $\theta_3$ is smaller than the second angle $\theta_4$; and when the magnification of the lens 130 is greater than one, the first angle $\theta_3$ is greater than the second angle $\theta_4$. For example, when the magnification of the lens 130 is one, if the second angle $\theta_4$ is 30°, the first angle $\theta_3$ is also 30°; however, when the magnification of the lens 130 is 0.5, if the second angle $\theta_4$ is 30°, the first angle $\theta_3$ is 15°. In this embodiment, for example, the magnification of the lens 130 is one, and both first angle $\theta_3$ and the second angle $\theta_4$ are 30°; however, the present invention is not limited to this.

Referring to FIGS. 9 and 10, when using the pen-like optical input device 10, the user may hold the first end 111 of the body 110, and make the urging portion 117 of the second end 112 urge the work surface 20. At this time, the contact surface 116 is parallel to the work surface 20, and through a disposition manner that the axis of the first end 111 inclines to the contact surface 116, the first end 111 also inclines to the work surface 20, thereby forming an angle similar to the one formed between a penholder and the work surface 20 when the user holds a pen.

When the user operates the pen-like optical input device 10, the light source 120 emits a light ray which penetrates the body and travels to the work surface 20 through the light-transmissive hole 113. After that, a reflected light ray is generated since the light ray is reflected by the work surface 20. Then, the reflected light ray enters the body 110 through the light-transmissive hole 113, and travels to the light sensing unit 140 after being refracted by the lens 130, and then is received by the optical sensor 142. At this time, since the angle between the optical axis 131 of the lens 130 and the normal 118 of the contact surface 116 and the angle between the optical axis 131 of the lens 130 and the normal 210 of the work surface 20 are the same, that is, the degree of the second angle $\theta_4$ is equal to that of the angle $\theta_2$, the degree of the first angle $\theta_3$ is also equal to that of the angle $\theta_2$.

Therefore, the first angle $\theta_3$ compensates the angle between the first end 111 of the body 110 and the work surface 20, and the sensing range of the optical sensor 142 relative to the lens 130 is increased, such that the reflected light ray after being refracted can be entirely imaged in the sensing range of the optical sensor 142. Therefore, the imaging range of the reflected light ray will not exceed the sensing range of the optical sensor 142 because of the change of an object distance between the optical axis 131 and the work surface 20.

Figure 11:
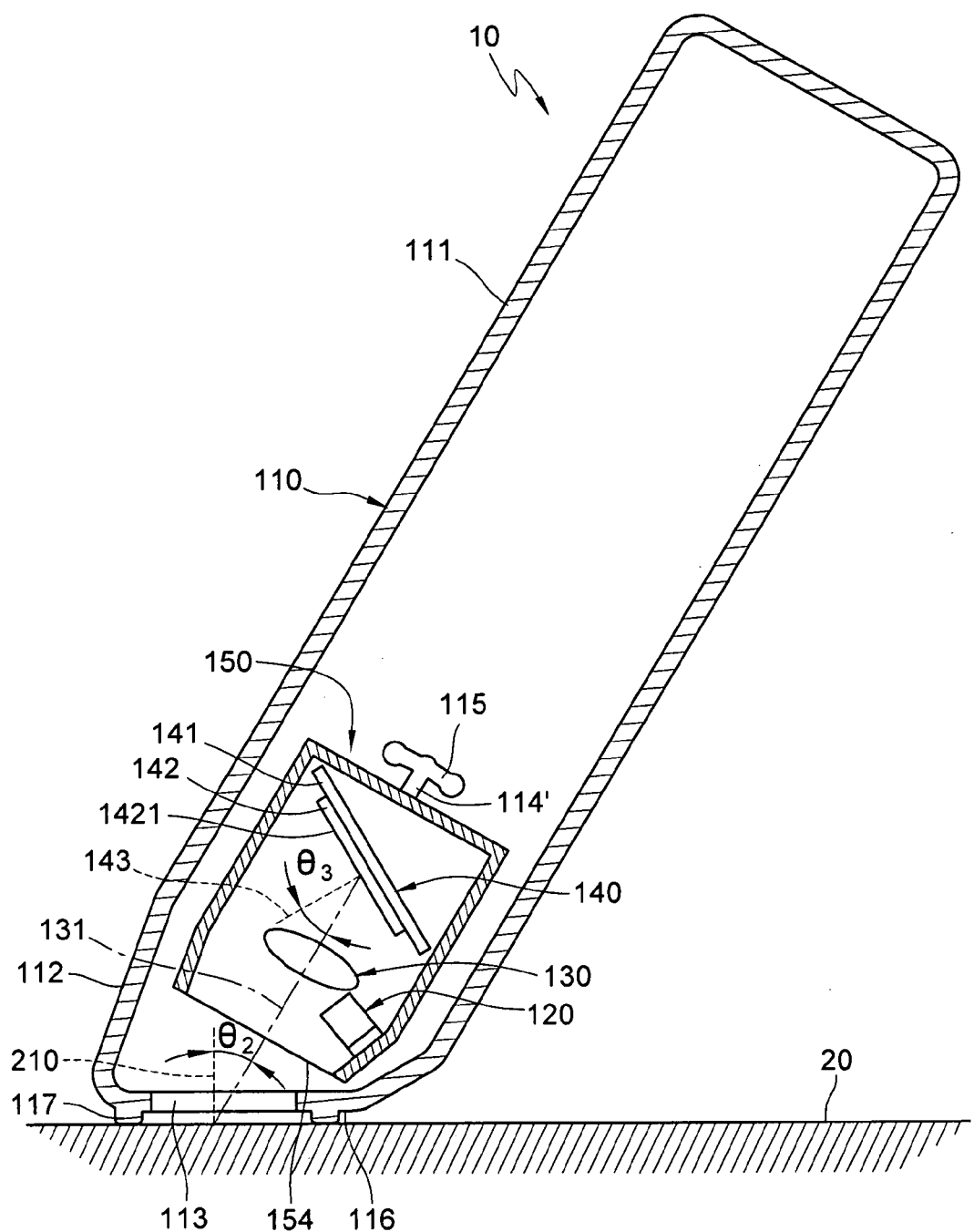
FIG. 11 is a schematic cross-sectional view of the third embodiment of the present invention on which a case is disposed.

In addition, in this embodiment, a disposition manner of the pen-like optical input device 10 according to the second embodiment of the present invention may also be adopted, that is, a case 151 capable of moving along an axis direction of the body 110 and swinging relative to the body 110 is disposed on the body 110, as shown in FIG. 11. Furthermore, the light source 120, the lens 130 and the light sensing unit 140 are disposed in the case 151, such that the case 151, the light source 120, the lens 130 and the light sensing unit 140 form an optical-mechanical module 150. Therefore, in use of the pen-like optical input device 10, when the contact surface 116 of the body 110 and the work surface 20 fail to form a parallel status (the degree of the angle between the optical axis 131 and the normal 210 of the work surface 20 changes) due to a personal habit of the user, the relative position of the case 151 in the body 110 can be moved or swung, so as to change the object distance from the optical axis 131 of the lens 130 to the work surface 20 and/or the degree of the angle between the optical axis 131 and the normal 210 of the work surface 20, such that the angle $\theta_3$ is maintained in a compensation range of the angle $\theta_2$.

For example, when the angle $\theta_2$ between the optical axis 131 and the normal 210 of the work surface 20 changes from 30° to 35° or 25°, the angle $\theta_2$ between the optical axis 131 and the normal 210 of the work surface 20 can be corrected from 35° or 25° to 30° through adjustment on an swinging angle of the case 151 relative to the body 110, so as to maintain the corresponding relation between the angel $\theta_2$ and the first angle $\theta_3$ and the sensing range of the optical sensor 142 for the reflected light ray, such that the reflected light ray after being refracted can be entirely imaged on the optical sensor 142 and a good image quality can be obtained.

According to the pen-like optical input device of the present invention, a light source, a lens and a light sensing unit are disposed in a body, and a normal of a light receiving surface of the light sensing unit inclines to an optical axis of the lens, such that a sensing range of the light sensing unit is increased. Therefore, when the user holds the pen-like optical input device with a general pose for holding a pen (a penholder inclines to the work surface), an angle between the normal of the light receiving surface and the optical axis can compensate an angle formed between the optical axis and the normal of the work surface, such that an imaging range generated after a reflected light ray is refracted by the lens can entirely fall into the sensing range of the optical sensor, thereby obtaining a good image quality.

What is claimed is:

1. A pen-like optical input device, comprising:
    a body;
    a light source, disposed in the body, wherein the light source emits a light ray to the outside of the body, and a reflected light ray is generated outside the body;
    a light sensing unit, disposed in the body, wherein the light sensing unit receives the reflected light ray; and
    a lens, disposed in the body, wherein the reflected light ray is refracted to the light sensing unit through the lens;
    wherein the light sensing unit comprises a light receiving surface on a side facing the lens; a normal of the light receiving surface inclines to an optical axis of the lens, a first angle exists between the normal of the light receiving surface and the optical axis of the lens, and a degree of the first angle is in direct proportion to a magnification of the lens.

2. The pen-like optical input device according to claim 1, wherein the body comprises a light-transmissive hole and a contact surface, the light-transmissive hole is disposed in the contact surface, the light ray penetrates the body through the light-transmissive hole, and the reflected light ray enters the body through the light-transmissive hole.

3. The pen-like optical input device according to claim 2, wherein a normal of the contact surface inclines to the optical axis of the lens, and a second angle exists between the normal of the contact surface and the optical axis of the lens, wherein a degree of the second lens is in direct proportion to the magnification of the lens.

4. The pen-like optical input device according to claim 3, wherein when the magnification of the lens is one, the degree of the first angle is equal to the degree of the second angle.

5. The pen-like optical input device according to claim 3, wherein when the magnification of the lens is smaller than one, the degree of the first angle is smaller than the degree of the second angle.

6. The pen-like optical input device according to claim 3, wherein when the magnification of the lens is greater than one, the degree of the first angle is greater than the degree of the second angle.

7. A pen-like optical input device, comprising:
    a body; and
    an optical-mechanical module, disposed in the body, and capable of swinging relative to the body and/or moving along an axis direction of the body, wherein the optical-mechanical module comprises a light source, a light sensing unit and a lens, and the light sensing unit comprises a light receiving surface on a side facing the lens;

wherein a normal of the light receiving surface inclines to an optical axis of the lens, a first angle exists between the normal of the light receiving surface and the optical axis of the lens, and a degree of the first angle is in direct proportion to a magnification of the lens.

8. The pen-like optical input device according to claim 7, wherein the body comprises a light-transmissive hole and a contact surface, the light-transmissive hole is disposed in the contact surface, the light source emits a light ray, the light ray penetrates the body through the light-transmissive hole, and a reflected light ray is generated outside the body, and the reflected light ray enters the body through the light-transmissive hole and is refracted to the light receiving surface through the lens.

9. The pen-like optical input device according to claim 8, wherein a normal of the contact surface inclines to the optical axis of the lens, and a second angle exists between the normal of the contact surface and the optical axis of the lens, wherein a degree of the second lens is in direct proportion to the magnification of the lens.

10. The pen-like optical input device according to claim 9, wherein when the magnification of the lens is one, the degree of the first angle is equal to the degree of the second angle.

11. The pen-like optical input device according to claim 9, wherein when the magnification of the lens is smaller than one, the degree of the first angle is smaller than the degree of the second angle.

12. The pen-like optical input device according to claim 9, wherein when the magnification of the lens is greater than one, the degree of the first angle is greater than the degree of the second angle.

\* \* \* \* \*